Patented July 11, 1939

2,165,337

UNITED STATES PATENT OFFICE 2,165,337

4,4'-TRICARBOCYANINE SALTS AND THEIR PREPARATION

Leslie G. S. Brooker, Rochester, N. Y., assignor, by mesne assignments, to Eastman Kodak Company, Rochester, N. Y., a corporation of New Jersey No Drawing. Original application January 16, 1933, Serial No. 651,870. Divided and this application August 23, 1934, Serial No. 741,145

18 Claims. (Cl. 260—240)

This invention relates to tricarbocyanine salts and more particularly to 4,4'-tricarbocyanine salts and a method for their preparation.

This application is a division of my copending application Serial No. 651,870, filed January 16, 1933. In this copending application, a preparation of tricarbocyanine salts, wherein a strong organic base is employed as a condensing agent, is described. The 4,4'-tricarbocyanine salts, described herein, are useful as photographic sensitizers in the infra-red as described in my copending application, Serial No. 652,029, filed January 16, 1933.

It is an object of the present invention therefore to provide 4,4'-tricarbocyanine salts. A further object is to provide such 4,4'-tricarbocyanine salts as are valuable as photographic sensitizers. A still further object is to provide a method of preparing such salts. Other objects will appear hereinafter.

The 4,4'-tricarbocyanine salts are prepared by condensing two molecular proportions of a lepidine salt which has the following structure:

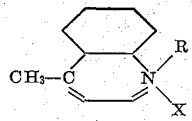

wherein R represents an alkyl group such as methyl, ethyl, n-butyl or allyl groups and X represents an acid radical such as halide or any other suitable anion, with one molecular proportion of a dianilide of glutaconic aldehyde, in the presence of a strong organic base.

The reaction can be represented as follows:

In this reaction, any condensation product of a primary aromatic amine and glutaconic aldehyde will suffice for the dye condensation. Such compounds are referred to hereinafter as dianilides in accordance with the nomenclature used by Zincke, Ann. 333, 314 (1904).

A similar method for the preparation of 2,2'-tricarbocyanine salts has been described in British Patent 354,826. However, I have found that this method cannot be applied to the preparation of 4,4'-tricarbocyanine salts unless a strong organic base is employed. Some of the strong organic bases which I have found may be used are n-butylamine, diethylamine, triethylamine, tri-n-butylamine, piperidine, N-methylpiperidine, triethanolamine, and β-diethylamino ethyl alcohol; these bases have a dissociation constant substantially greater than the dissociation constant of pyridine. Piperidine or triethylamine is preferable. The usual basic condensing agents such as sodium ethylate, are incapable of effecting the condensation.

Further, I have found that carrying out the condensation at room temperatures or lower is a decidedly superior procedure to the usual procedure of boiling in alcoholic solution, much higher yields being obtained at the lower temperatures.

Examples of typical tricarbocyanine salts and their preparation will now be presented.

*Example 1.—1,1'-diethyl-4,4'-tricarbocyanine iodide*

12 parts (2 mols.) of lepidine ethiodide were dissolved in 25 parts of hot absolute ethyl alcohol and the solution chilled in a freezing mixture

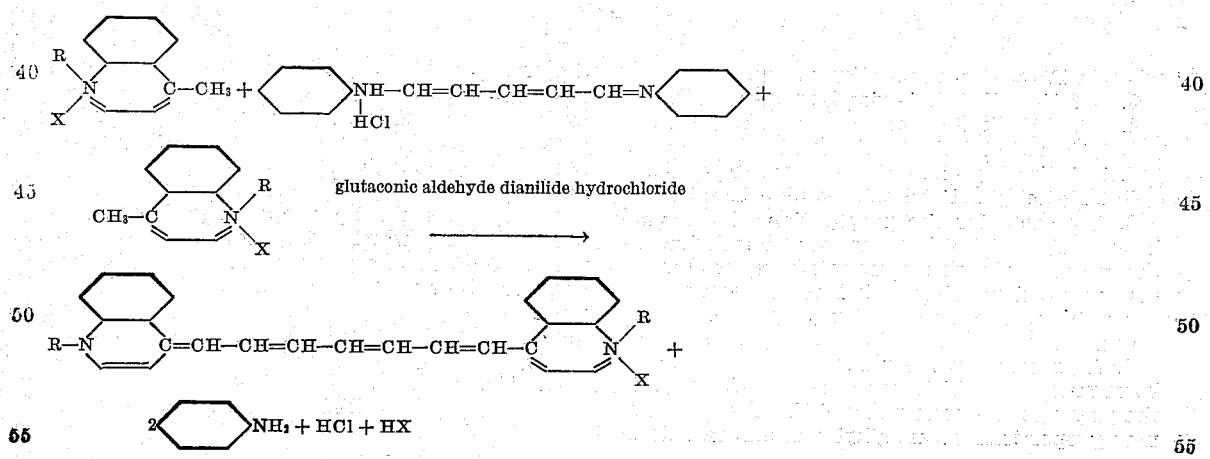

with stirring, so as to obtain very small crystals of the quaternary salt. 5.6 parts (1 mol.) of glutaconic aldehyde dianilide hydrochloride were then added, the mixture stirred, and then 3.4 parts (2 mols.) of piperidine added, with cooling and shaking. A dark coloration rapidly developed and the whole was stood aside in the icebox overnight. Next morning the muddy liquors were filtered off, the residue washed with acetone until most of the tarry impurities had disappeared, followed by water and then more acetone. The residue was next boiled with a small quantity of methyl alcohol, cooled and filtered, and this treatment repeated once or twice, until the filtrate was a clear green color and the dye on the filter looked clean. It then consisted of coppery crystals and gave a somewhat dull green solution. The dye could be successfully recrystallized from methyl alcohol, especially if the hot liquors were chilled so as to expose the dye to the action of the hot alcohol for as short a time as possible.

*Example 2.—1,1'- dimethyl-4,4'- tricarbocyanine iodide*

11.4 parts (2 mols.) of lepidine methiodide were treated as in Example 1. The dye obtained was recrystallized from methyl alcohol and obtained as a dark brown powder. The color of the methyl alcohol solution was olive green.

*Example 3.—1,1'-diallyl-4,4'-tricarbocyanine iodide*

Lepidine alliodide was treated as in Example 1. The dye was obtained as beautiful reddish coppery crystals.

The parent base may be substituted in the available positions, but this does not affect or diminish the scope of this invention.

What I claim as my invention and desire to be secured by Letters Patent of the United States is:

1. A tricarbocyanine salt of the following structure:

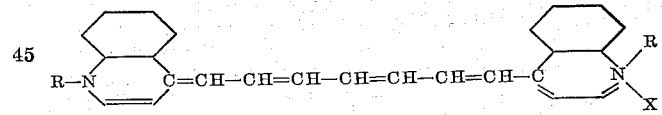

wherein R represents an alkyl group and X represents an acid radical.

2. A tricarbocyanine iodide of the following structure:

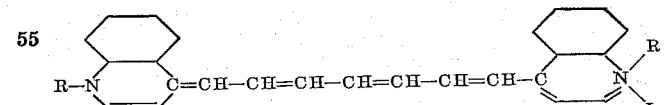

wherein R represents an alkyl group.

3. A 1,1'-dialkyl-4,4'-tricarbocyanine salt.
4. A 1,1'-dialkyl-4,4'-tricarbocyanine iodide.
5. 1,1'-diethyl-4,4'-tricarbocyanine iodide.
6. 1,1'-dimethyl-4,4'-tricarbocyanine iodide.
7. 1,1'-diallyl-4,4'-tricarbocyanine iodide.
8. A process for the preparation of a tricarbocyanine salt which comprises condensing, in the presence of a strong organic base, two molecular proportions of an alkyl quaternary salt of a lepidine with one molecular proportion of glutaconic aldehyde dianilide hydrochloride.
9. A process for the preparation of a tricarbocyanine salt which comprises condensing, in the presence of a strong organic base, two molecular proportions of an alkyl quaternary salt of lepidine with one molecular proportion of a dianilide of glutaconic aldehyde.
10. A process for the preparation of a tricarbocyanine salt which comprises condensing, in the presence of a trialkylamine, two molecular proportions of an alkyl quaternary salt of lepidine with one molecular proportion of glutaconic aldehyde dianilide hydrochloride.
11. A process for the preparation of a tricarbocyanine iodide which comprises condensing, in the presence of a strong organic base, two molecular proportions of an alkiodide of lepidine with one molecular proportion of glutaconic aldehyde dianilide hydrochloride.
12. A process for the preparation of a tricarbocyanine iodide which comprises condensing, in the presence of piperidine, two molecular proportions of an alkiodide of lepidine with one molecular proportion of glutaconic aldehyde dianilide hydrochloride.
13. A process for the preparation of a tricarbocyanine iodide which comprises condensing, in the presence of triethylamine, two molecular proportions of an alkiodide of lepidine with one molecular proportion of glutaconic aldehyde dianilide hydrochloride.
14. A process for the preparation of a tricarbocyanine iodide which comprises condensing, in the presence of piperidine, two molecular proportions of the ethiodide of lepidine with one molecular proportion of glutaconic aldehyde dianilide hydrochloride.
15. A process for the preparation of a tricarbocyanine iodide which comprises condensing, in the presence of triethylamine, two molecular proportions of the ethiodide of lepidine with one molecular proportion of glutaconic aldehyde dianilide hydrochloride.
16. A process for the preparation of a tricarbocyanine iodide which comprises condensing in the presence of piperidine, two molecular proportions of the methiodide of lepidine with one molecular proportion of glutaconic aldehyde dianilide hydrochloride.
17. A process for the preparation of a tricarbocyanine salt which comprises condensing, in the presence of an organic base having a dissociation constant substantially greater than that of pyridine, two molecular proportions of a quaternary salt of lepidine with one molecular proportion of a glutaconic aldehyde dianilide hydrohalide.
18. A process for the preparation of a tricarbocyanine salt which comprises condensing, in the presence of an organic base having a dissociation constant substantially greater than that of pyridine, two molecular proportions of an alkyl quaternary salt of lepidine with one molecular proportion of glutaconic aldehyde dianilide hydrohalide.

LESLIE G. S. BROOKER.